US008498926B2

(12) United States Patent
Everaert et al.

(10) Patent No.: US 8,498,926 B2
(45) Date of Patent: *Jul. 30, 2013

(54) SYSTEMS AND METHODS FOR ENABLING TRADING OF FINANCIAL INSTRUMENTS (75) Inventors: Michel Remy Everaert, Kent (GB); Francesco Cicero, London (GB); Alexander Kiss, Brooklyn, NY (US); Brian Cummins, White Plains, NY (US)

(73) Assignee: GFI Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,159

(22) Filed: May 21, 2012

(65) Prior Publication Data
US 2012/0284166 A1    Nov. 8, 2012

Related U.S. Application Data (60) Continuation of application No. 13/206,651, filed on Aug. 10, 2011, now Pat. No. 8,195,563, which is a division of application No. 11/738,204, filed on Apr. 20, 2007, now Pat. No. 8,032,443, which is a continuation-in-part of application No. 11/541,168, filed on Sep. 28, 2006, now abandoned.

(51) Int. Cl.
*G06Q 40/00*    (2012.01)

(52) U.S. Cl.
USPC .......................................................... 705/37

(58) Field of Classification Search
USPC .......................................................... 705/37
See application file for complete search history.

(56) References Cited

U.S. PATENT DOCUMENTS

| 2003/0149653 | A1* | 8/2003 | Penney et al. | 705/37 |
| 2004/0107154 | A1* | 6/2004 | Nishimaki | 705/36 |
| 2005/0165670 | A1* | 7/2005 | Woodmansey et al. | 705/37 |
| 2006/0036534 | A1* | 2/2006 | Hirani et al. | 705/38 |

* cited by examiner

*Primary Examiner* — Jessica Lemieux
(74) *Attorney, Agent, or Firm* — Weiss & Arons LLP (57) ABSTRACT A method of trading a foreign currency option on an electronic trading system may include executing a trade of the foreign currency option between a buyer and a setter, locking the trading system with respect to the traded foreign currency option, querying the buyer whether the buyer desires to buy or sell additional volume of the option, querying the seller whether the seller desires to sell or hay additional volume of the option, and authorizing additional participants to join the trade and querying the additional participants whether each of the additional participants desires to buy or sell a volume of the option.

19 Claims, 5 Drawing Sheets

SYSTEMS AND METHODS FOR ENABLING TRADING OF FINANCIAL INSTRUMENTS

CROSS REFERENCE TO RELATED APPLICATIONS

This application is a continuation of U.S. patent application Ser. No. 13/206,651, filed on Aug. 10, 2011(hereinafter, "the '651 application") entitled, "Systems and Methods for Enabling Trading of Financial Instruments," said application being incorporated herein by reference in its entirety. The '651 application is a divisional of U.S. patent application Ser. No. 11/738,204, thereinafter, "the '204 application"), filed on Apr. 20, 2007, entitled, "Systems and Methods for Enabling Trading of Currency," said application having issued as U.S. Pat. No. 8,032,443 on Oct. 4, 2011, said application being incorporated herein by reference in its entirety. The '204 application is a continuation-in-part of co-pending U.S. patent application Ser. No. 11/541,168, filed on Sep. 28, 2006, entitled, APPARATUS, METHOD AND SYSTEM FOR PROVIDING AN ELECTRONIC MARKETPLACE TO JOIN A TRADE FOR CREDIT DEFAULT SWAPS AND OTHER FINANICAL INTERESTS, AND TO DEAL-BY-VOLUME FOR THE INTEREST, said application being incorporated herein by reference in its entirety.

BACKGROUND OF THE INVENTION

This invention relates to enabling trading of financial products. More particularly, this invention relates to enabling trading of currencies.

Recently, electronic trading systems and platforms have become very popular for trading of financial products such as stocks, bonds, foreign currency, and any other suitable financial security or instrument Options on currencies also form part of the subject matter of the invention and are typically referred to as FX options. FX options are a particular kind of financial contract that banks and corporations trade as a way of placing positions on the fluctuations in the exchange rates between currencies or to protect themselves from those fluctuations.

However, the capabilities of conventional electronic trading systems have not been expanded to exploit the transparency and other advantages of a real-time—i.e., a time, such as a few seconds, a few portions of a second or less, that is sufficiently short to provide users—i.e., individual users or groups of users—with a view of the current workings of the market—electronic market in currency options.

For example, real-time volume in an electronic trading system that was recently traded in the currency options market typically is not used to provide a basis for further trading. Rather, the trade matches, and then any new trades in the electronic trading system are typically matched at a different price, without any particular relationship with the previous trade.

In order to increase transparency and volume of trading in the currency options market, it would be desirable to use recently transacted volume as a basis for future trades.

SUMMARY OF THE INVENTION

It is an object of the invention to increase transparency and volume of trading at least in the currency options market by using recently transacted volume as a basis for future trades and allow users other than the original trading users to more easily trade at the originally traded price.

In one embodiment of the invention, an application according to the invention may ease the process of getting prices to market, thereby enabling easier online trading of currency options and allowing the analysis of market trends using the latest and most reliable prices. Furthermore, certain features of one embodiment of the invention may relate to allowing users to enter into a separate and timed market. Preferably, this separate and timed market may be independent of originally traded volume in an electronic trading system according to the invention.

In another embodiment of the invention, different users may have different access to aspects of the market. This embodiment of the invention will be described in more detail below.

A graphical user interface for use in trading a foreign currency option according to the invention is provided. The trading may include executing a trade of a foreign currency option between a buyer and a seller, locking the trading system with respect to the traded foreign currency option, querying the buyer whether the buyer desires to buy additional volume of the option, querying the seller whether the seller desires to sell additional volume of the option, authorizing additional participants to join the trade, and querying additional participants whether each of the additional participants desires to buy or sell a volume of the option. The graphical user interface may include a countdown timer showing time left for a work up and/or join the trade opportunity, currency pair information, and trade action buttons.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

In one embodiment of the invention, user classes and characteristics are broken down among various categories. The classes of users may be broken down into brokers, broker clerks, interactive traders, semi-interactive traders and view-only traders.

Figure 1:
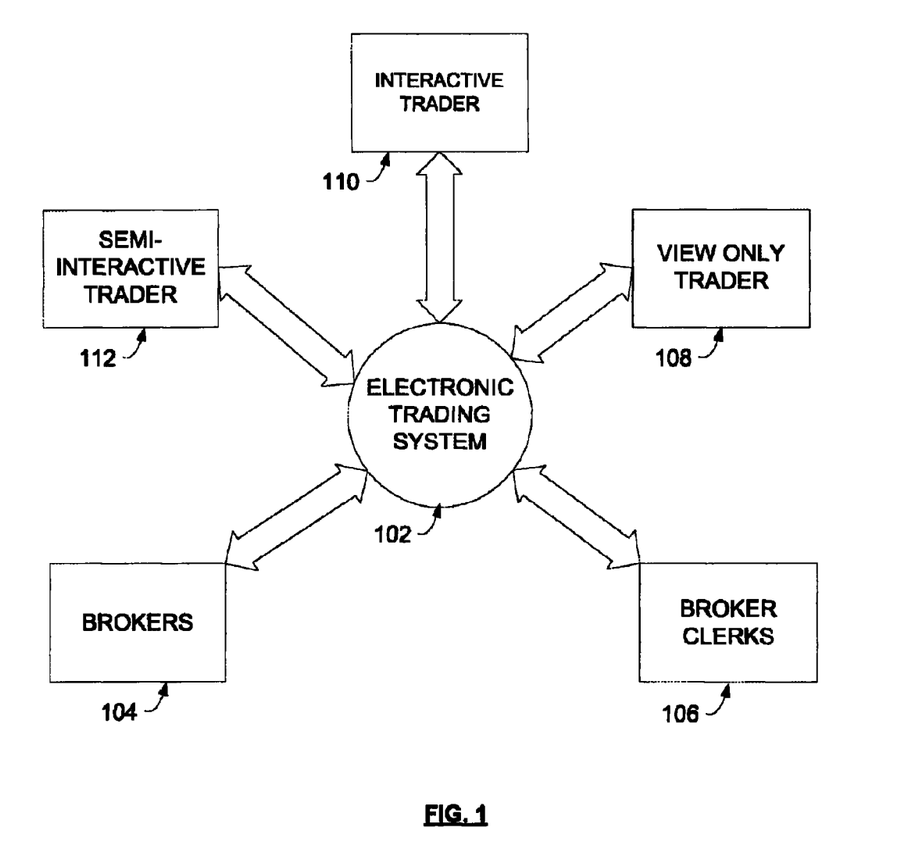
FIG. 1 is an exemplary flow diagram that illustrates the interactions of various categories of users with an electronic trading system according to the invention.

FIG. 1 shows an exemplary flow diagram that illustrates the interactions of various categories of users with an electronic trading system according to the invention. FIG. 1 shows electronic trading system 102, and the interactions that are permitted between system 102 and, respectively, brokers 104, broker clerks 106, view only trader 108, interactive trader 110, and semi-interactive trader 112. Hedge funds may also use the system acting through their prime brokers, although the hedge funds use being subject to credit approval and other credit concerns.

Broker 104 preferably facilitates the trade between two counterparties. In one embodiment of the invention, broker 104 may allow each of the counterparties to remain anonymous until the deal is fully executed. Broker 104 may be one of the only users who can see the entire market and the outside sources contributing prices. Broker 104 has full control of the prices in the market and can add, change, or remove prices at preferably any time.

Brokers 104 may interact with electronic trading system 102 in the following ways, as shown in FIG. 1. They are required to log in. Thereinafter, they may preferably receive permissions and interfaces that are provided by system 102. Then, brokers 104 may view prices, enter prices execute on prices already resident in the system and have their prices executed upon. Additionally, brokers 104 may preferably receive execution alerts relating to their own trade executions or to the other executions in a market that is relevant to them.

Broker clerks 106 may have the main responsibility of entering the details of an executed trade into system 102 for downstream analysis and STP (Straight Through Processing—a system and/or method for allowing the counterparties to enter the trade details into their respective back end processing centers). Broker clerk 106 may be the only other user, in addition to broker 104, who can see the entire market and the outside sources that are contributing prices.

Broker clerks 106 may be granted entitlements that preferably allow them to add, change or remove any prices in the market, just like broker 104. However, a broker clerk's price entry and execution rights may be optional instead of obligatory A view only trader 108 may be a user that is substantially external to the system as compared to broker 104. The external nature of view only trader 108 may be defined by the lack of ability to enter prices and execute prices.

Interactive trader 110 may also be external to system 102 as compared to broker 104 but may have the ability to view, enter and execute prices of a currency pair and other suitable product for which interactive trader 110 is permissioned.

Semi-interactive trader 112 may also be external to system 102 as compared to broker 104. Semi-interactive trader 112 may have the ability to contribute prices to the market through system 102. Unlike interactive trader 110, semi-interactive trader 112 may not be granted permission to execute trades via system 102, though the prices they enter may be executed upon by other suitable authorized users. In one embodiment of the invention, semi-interactive trader 112, as well as all external traders, may have the ability to directly contact a broker 104 to execute on a price in the system.

With respect to the operating environment of system 102 according to the invention, one embodiment of system 102 may provide web-based interfaces that operate with suitable Microsoft Internet Explorer versions, such as 6.0 or higher, or other suitable web browser. Furthermore, system 102 itself may only operate on a server running a currently-approved version of the Solaris application, or other suitable server software. The database that may be used for the invention can be Oracle 10 g or other suitable database. With respect to implementation of a system according to the invention, it is assumed that an application server can be able to communicate with a user's system bi-directionally.

A further aspect of the invention may include the ability to "work up" a trade after the original execution. "Working up" a trade may include submitting a request to buy or sell additional size of the traded item at the same price, for the same currency pair, product, cut—i.e., a term that defines the expiration time of an option—and tenor—i.e., a term that defines the maturity date of an option—of the item that was recently traded in the electronic trading system of the previously executed trade. The "worked up" trade may preferably occur in a separate and timed market in the same system 102 or in another suitable trading system. It should be noted that this market may be referred to herein as a work up/join the trade market. The difference with respect to the "work up" and "join the trade" aspects of the market is as follows. The original trade participants are referred to as participating in the "work up" and the participants who were not original participants are referred to as participating in the "join the trade." However, the market of work up and join the trade is one and the same market—i.e., the work up/join the trade market and buyers and sellers match according to their respective priority.

In one embodiment of the invention, "work up" features may be made available to the users in the same group as the originating users of the execution. Users that were not involved in the execution of the trade may be given "join the trade" optionality or features as will be explained in greater detail below.

In one embodiment of the "work up" feature, any user with semi-interactive or interactive permission type, as described above, may "work up" the trade. "View Only" and "restricted" permission types may preferably not have any of the "work up" features displayed on their respective interfaces.

A further rule associated with "work up" may require an additional level of participation from the semi-interactive or interaction permission type traders. While status as semi-interactive and interactive permission types may be required as a necessary condition to join work-up, nevertheless, if the semi-interactive or interactive users are not signed on at the end of the timer for the worked up trade to the electronic trading system (or suitable trading application) in which the trade is occurring, then the semi-interactive or interactive users may be denied access to the matching process.

In one further embodiment of the work up rules according to the invention, the work up feature may suppress an execution pop-up on the interface that is normally displayed after an execution occurs in the electronic trading system or application. Details of the specific execution may appear in a "Live Trade Details" section of the live trade interface provided to users. "Live trade" as used herein refers to the trade that is being worked up following the execution of the original trade.

One further feature of working up trades according to the invention may be that a broker or broker clerk, as defined above, that enter on behalf of a customer into a live trade with a certain customer code that was involved in the initial execution will preferably be "working up" the live trade opportunity on behalf of the original code group.

Another aspect of the invention relates to a feature referred to herein as "join the trade." Users not directly involved in the original trade execution may be given the option to "join the trade" during the course of a trade being "worked up." Join the trade is a feature by which a user is submitting a request to buy or sell size at the same price, for the currency pair, product, cut and tenor that was recently executed by other users in a separate and timed market in the same or different electronic trading systems and/or applications.

Preferably, only users that have the associated portion of the trading application or system open and operable, said portion (which may be a trading matrix or other suitable trading interface) which may be referred to hereinafter as a "trading pod" or "pod", may see and/or utilize join the trade features. With respect to the permission types described above, one embodiment of the invention may only allow semi-interactive and interactive to join the trade while view only traders, or other similarly restricted traders or users may not have any of the join the trade features displayed on their respective screens.

Similar to work up privileges, any semi-interactive or interactive user may preferably be signed on to the trading system and/or application at the end of the timer to participate in the matching at the conclusion of the live trade.

A broker or broker clerk that enters into the live trade with a customer association that was not involved in the initial execution will be "joining" the live trade opportunity on behalf of the customer association.

With respect to the workflow of a work up/join the trade operation according to the invention, an execution in a trading system and/or application according to the invention preferably triggers the work up/join the trade feature. Alerts and indicators may be sent preferably immediately to interactive users who have the relevant trading pods open on their trading interfaces.

Following the distribution of the alerts and/or indicators, an application according to the invention may have certain user's prices automatically entered into the live trade.

When original trades are only partially executed, the remaining size may be automatically included in the work up. A live trade window, when displayed on a user's interface, may indicate a current user's live trade status as "worked up" because he still has untraded volume from the original order. The live trade window is explained in more detail below with respect to the portion of the specification corresponding to FIG. 3.

The user may cancel the untraded volume or resubmit a new size prior to the timer for the live trade expiring. Nevertheless, the user associated with the residual volume may not be required to review or respond to the live trade window for the residual size to be included in the work up. Additionally, if the user holds the price using a hold feature—i.e., a feature that allows a user to retain the values of a previously placed order though the held order is not visible or exposed to the market and cannot be traded on without further action on the part of the associated user—while time still remains on the live trade, then automatic work up associated with the residual size may be removed.

In yet another feature of work up/join the trade functionality, prices in the system/application that are equal to the executed price may automatically join the live trade. A user associated with a price that is already in the system and equal to the price of the live trade preferably does not have to review or respond to the live trade window for the size associated with his price to be joined in the live trade. A live trade window, when displayed, may indicate the current user's status as "joined" in the live trade. The user may cancel the order or resubmit a new size prior to the timer expiring. If the user holds the price using the hold option, as described above, then the automatic join with the live trade may be removed.

During the timer countdown of a live trade, users may work up or join the trade. A user may have the ability to modify their respective entry during the countdown to the match of the live trade. However, in this embodiment of the invention, the user may only preferably provide one entry per live trade.

At the end of a specified time interval, a trading application and/or trading system may automatically match up the buyers and sellers that participated in the live trade of the work up/join the trade trading opportunity.

Based on the overall size and direction of the order entered, a single bid/offer may be matched up with multiple bid/offers. Those with priority, said priority which is defined in more detail below, may have their respective entire size matched before moving to the next level of priority. If there is not an equal amount of size of buyers to sellers or sellers to buyers, the outstanding size may be thrown out. Once matched, all executed trades may be sent to a suitable trade recordation application or system such as FX Blotter.

It may be a rule of a trading system according to the invention that outstanding size on both sides may preferably not occur. Instead, only one side of the trade, whether it be the buy or sell side, or neither side, may have outstanding size following the match.

Following execution, the matched trades may automatically execute in a trading application or system according to the system and, thereafter, trade execution messages may be displayed on relevant user's user interfaces. Rules for sending execution alerts are detailed below in the sections relating respectively to interactive trading alerts, interactive trading pop ups, and broker interactive pop ups and emails below.

In one embodiment of the invention, trades executed as part of the live trade may not trigger an additional work up/join the trade feature again. Furthermore, in one embodiment of the invention, only trades executed from relevant, preferably predetermined trading pods may trigger the work up/join the trade feature.

If the remaining size is not executed as part of the work up/join the trade, the price and partial size may return to be posted on the suitable trading system and/or application. Any additional size added by the user either during the live trade or after the expiration of the timer may be thrown out. If a partial execution occurs at the conclusion of the live trade, the remaining size may also be returned to the trading system and/or application, similar to the unexecuted remaining size described above. Additionally, if the user decreased the amount, the reduced size may be sent back to the trading application and/or the trading system.

In yet another embodiment of the invention, if any remaining size is not executed as part of the work up, and the price is "one cancelled other" (OCO)—i.e., if any part of the bid/offer is executed and another part of the bid/offer remains unexecuted, then the systems places the remaining size as a held order—then the price and size may be sent back to the trading application/system in a held state.

Additionally, if a user removed any automatically entered prices from the work up or join the trade, then the prices and sizes may be removed from the application and/or system following the conclusion of the countdown timer.

In yet another embodiment of the system according to the invention, when users add active trading pods to their respective user interfaces during a work up/join the trade, then the new users may or may not receive any additional alerts relating to the work up/join the trade, other than the alerts relating to the indications of the live trade pod. As such, in certain embodiments, the new users may not be able to be associated with the ongoing work up/join the trade trading opportunity.

Additionally, in one embodiment of the invention, if the system should go down during a work up/join the trade trading opportunity, the work up join the trade may be cancelled. Users may receive a live trade match status message that indicates that no execution took place.

Figure 2:
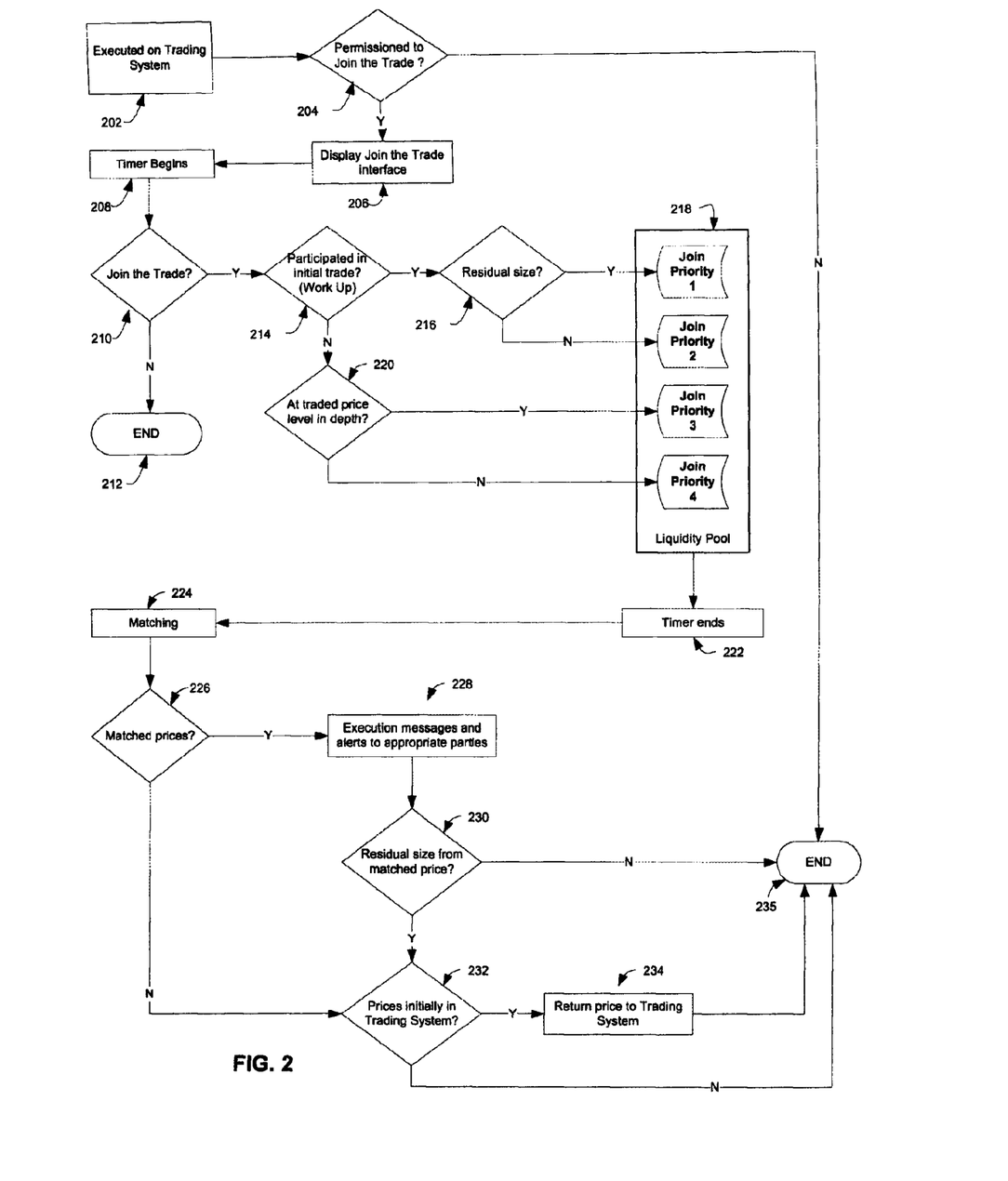
FIG. 2 is an exemplary flow diagram that shows a method according to the invention.

FIG. 2 shows an exemplary flow diagram that shows a method according to the invention. FIG. 2 preferably shows an execution that has occurred at step 202. The system may then query at step 204 whether a user is permissioned—i.e., authorized—to "work up the trade" and "join the trade".

If a user is permissioned to join the trade—i.e., has all the prerequisites for joining the trade such as the appropriate permission type and may also have the appropriate trading pod open on his interface—then the system may display a join the trade interface on the user's display as shown at step 206.

The aforementioned process including steps 204 and 206 may preferably be performed substantially simultaneously for a group of users that may have been predetermined or otherwise preselected. Based on this process, a large group of users may be informed of the commencement of the join the trade trading opportunity and the beginning of the join the trade timer as shown at step 208.

At step 210, the system queries whether a user wishes to participate in the work up/join the trade trading opportunity. If a user actively or passively declines to participate in the work up/join the trade market, then he is not included in the work up/join the trade market as shown at step 212. (If, at a later point in time during the pendency of the join the trade market, the user elects to participate in the work up/join the trade market, he may be given the opportunity to participate).

When there is sufficient interest to continue the join the trade trading opportunity, then the system may determine at step 214 whether the users who have posted bids or offers in the join the trade market were users in the original trade (with respect to these users the join the trade market is characterized herein as a work up for the original trade.) If the users were involved in the original trade, and, consequently, the determination at step 214 is YES, the system may further determine, at step 216, whether the respective current bids and offers represent residual size from the original bids and offers in the system or the respective current bids and offers represent new size provided by the original participants to the trade during the work up/join the trade or during some other suitable time period.

If the determination at step 216 is yes, then the residual size may given the highest priority in the liquidity pool 218 of the size being matched in the join the trade market. If the answer to the determination at step 216 is no, then the new size from the original users may given priority in the liquidity pool 218 behind other original users" residual size. Trading priority in the liquidity pool puts a user's respective bid or offer before another bid or offer for available counter orders at the match of the join the trade trading opportunity.

In one embodiment of the invention, the following priority rule may be implemented. Each trade creates a set of two original users. These users are on two sides of the original trade execution—i.e., one a buyer and one a seller. In a case where, following the original execution, the buyer wanted to switch to the sell side for the work up/join the trade portion then priority between the two original users may be assigned according to a predetermined system-set parameter. For example, the original seller may be given priority before the original buyer on the sell side of the work up/join the trade opportunity.

If the answer to the query at step 214 is no, and the users are join the trade users and not work up users, then the system may query at 220 as to the depth of the size of the bid or offer posted. In one embodiment of the invention, the join the trade users may be prioritized in liquidity pool 218 based on the respective volumes, price support or by some other criteria as shown by the users. Nevertheless, in other embodiments of the invention, priority between any or all of the users may be determined in any suitable fashion.

The method further shows that at step 222 the join the trade/work up timer ends. At this point, any bids or offers that have a respective counter order are preferably matched at step 224.

The system may further query at step 226 whether matching occurred at the end of the timer. If matching between orders occurred, then the system shows at step 228 that execution messages and alerts to appropriate parties can be distributed. Before, after or when the execution occurs, the system may query at step 230 whether any residual size at the matched price exists.

If a residual size from the match remains as determined at query 230, of if the system at query 226 determines that no matching occurred, then the system queries at step 232 whether the remaining prices were initially in the system at trade execution step 202. If the prices were originally in the system, the prices may be returned to the trading system at step 234.

As described briefly above, another aspect of the invention relates to prioritizing the users of the join the trade market. Preferably, those participating in the work up/join the trade feature may be prioritized before they are matched. The users with the highest priority preferably have their respective size matched complementary buyers (or sellers) first.

The following hierarchy may be used to determine the matching prioritization for a work up/join the trade market. The highest priority may be assigned to the orders associated with user(s) involved in the initial execution that maintains a residual size in the work up/join the trade market. The next highest priority may preferably be assigned to orders associated with user(s) involved in the initial execution that does not have a residual size from the initial trade, but wishes to work up the live trade following execution of the original trade. In the event more than one user works up the trade, and enter the trade in the same direction, the group that has the earlier timestamp may preferably take precedence over the other.

The next highest priority may be assigned to the orders associated with user(s) that have the same price in the depth—i.e., position behind the best bid or offer as sorted by the time stamp. In the event more than one user exists on the same side of the trade, the user that has the earlier timestamp may preferably take precedence over the other.

The next highest level of priority may be assigned to join the trade users—i.e., users that join the worked up trade following the initial execution. If multiple users are present at this same hierarchy level—i.e., several users join the trade, the timestamp associated with each of the orders may be used to sort each user into the priority with which the trading system matches the respective trades.

The priority typically associated with the timestamp may also be determined depending on the user increasing or decreasing their respective size during the live trade. Thus, a user may be given a timestamp on initial entry of an order. Thereafter, if any member of a group associated with the user increases the size of the order in the live trade, the timestamp may be reset. Furthermore, if any member of the group decreases the size of the order in the live trade, the timestamp may not be reset and the user may retain their priority position on the live trade. In addition, if the direction of the order entered in the live trade is switched from buy to sell or from sell to buy, the timestamp may be reset.

A live trade window according to the invention may be an interface which appears on the user screen and may display all the work up/join the trade details. The live trade window may be the user's central control for each work up/join the trade offered.

In certain embodiments of the invention, the live trade window may be moved and placed in a different location on the user screen. In one further embodiment of the invention, the trading system may preferably persist in placing the live trade window in the user-defined location in future work up/join the trade markets.

Figure 3:
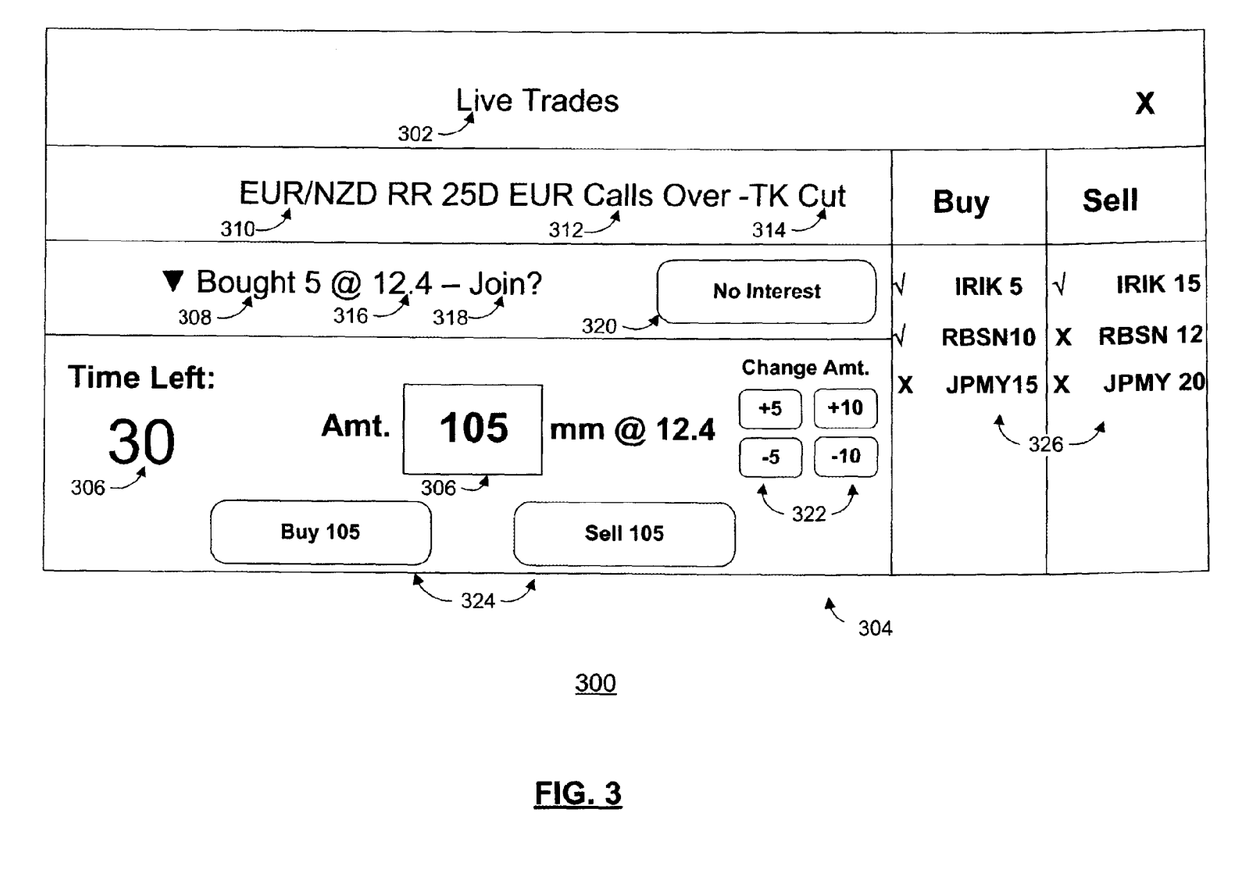
FIG. 3 is an exemplary graphic user interface according to the invention.

FIG. 3 shows that the live trade window 300 according to one embodiment of the invention may preferably include a header 302 and a body section 304. Header 302 may show the window is a live trade window. Body 304 of the window may display all or some of the individual live trades which the user can either work up or join. FIG. 3 shows a single live trade occurring.

If multiple live trades are occurring simultaneously (not shown in FIG. 3), then in one embodiment of the invention, the live trades may stack in the body of the window. Depending on the user's screen resolution, the window may grow to accommodate multiple live trades at once. If there are more live trades available to the user at one time than can be displayed, the live trade window may display a vertical scroll bar to allow the user to move through the live trades.

Body 304 may preferably display the trades in the order in which they enter into the window. Trades may appear from oldest to enter into the window to the newest to enter the window arranged from top to bottom or by some other suitable arrangement.

Following some suitable preferably predetermined time period following the expiration of the live trade, such time period being about 15 seconds or some other suitable time period, if the user has not manually removed the live trade, the work up/join the trade opportunity may be moved to the bottom of the live trade window 300.

During end-of-day processing, all expired live trade opportunities may be cleared out of the window. An expired live trade may preferably not be removed from the window unless the user has manually closed the opportunity or the end-of-day processing has completed.

In a further embodiment of the invention, live trades window 300 may pop up on a user's screen if the user's preferences are set accordingly. Nevertheless, live trades window 300 may be closed out of view on a particular user's screen. If configured to appear automatically, window 300 may reappear if the alert is triggered by a new work up/join the trade opportunity, or by double clicking on an independent live trade indicator in the trading pod (not shown).

It is important to note that reaction time forms an important factor of the work up/join the trade feature. It is important for a user to be able to acquire market information and react to changes in the market without undue delay. Therefore, each individual live trade display may be divided into the following sections to provide the necessary details in a clear display to the user.

Live trader countdown timer 306 may indicate the time available to respond to the live trade opportunity. In one embodiment of the invention, live trade countdowns may begin at thirty (30) seconds and countdown to zero. At zero, the live trade may expire. When timer 306 expires, a visual indication, such as "EXPIRED!" may appear in place of the countdown timer.

In one embodiment of the invention, timer 306 may be based on server time. But, server time governs the operation of the trade—not displayed time. The timer seconds on window 300 appear preferably as an indicator to the user but not as the final arbiter of the trade activity. Nevertheless, displayed timer 306 and server time will preferably be as close in synchronization as possible. Should a difference between server time and display time occur, all user action should be received by the trading system prior to the expiration of the server timer.

Live trade details of the display may include the work up/join the trade details. Some trade details may display differently depending on whether the live trade is a work up or a join the trade, as well as the current status of the live trade.

All users preferably receive information relating to the aggressor direction 308. For work up users, the direction may be from the appropriate perspective of the respective user.

Trade details may also show currency pair information 310, product information 312, market cutoff 314 (NY, TK, etc.), tenor [1 month, 3 month etc.] (not shown), and/or price 316. Work up users may have the size of the original execution included in the live trade details. Join the trade users may or may not receive this information.

A timer countdown bar (not shown) may have its color "countdown" as the remaining time decreases. The color may decrease from a full bar to an empty bar or through some other suitable visual indication. Preferably, the color within the bar should decay evenly and at a rate relative to the amount of time remaining on the counter.

An indicator 318 may appear to a user in the live trade details section to indicate if the live trade is a "work up" or "join the trade" opportunity. The indicator may not be displayed if the user has already entered into the opportunity.

An interface according to the invention may also include a live trade entry section. The live trade entry section may include the inputs and actions that are available to the user for the live trade opportunity. The live trade entry may include a text box 321 for adjusting the amount to be entered into the live trade. An entry field may be displayed through which the users may be able to submit their own desired size. The entry field may default the size to a trading system set default entry size for the associated currency pair and product. Increment/decrement buttons 322 may be available to the user to quickly add to or remove from the entered amount. In one embodiment of the invention, the values in buttons 322 may be to add to/subtract from the value in increments of 5 million, 10 million or some other suitable amount.

Action buttons 324 may be provided to the user to enter or ignore the live trade opportunity. The user may be given the option to enter the live trade by selecting the "buy" or "sell" button. Selecting either button may enter the entire group associated with the particular user that selected the button into the work up/join the trade for the specified amount and direction. All users associated with the user may receive an updated status as different users from the group modify the entry into the live trade.

As stated above, the users may be given an option to ignore the live trade by selecting the "no interest" button 320. When selected, the work up/join the trade opportunity may be removed from the live trade window completely for that user. Nevertheless, in one embodiment of the invention, other users associated with the group of the user who selected "no interest" may not be prevented from entering into the live trade.

Certain permission types, such as brokers or broker clerks, may receive an additional entry to work up/join the trade on behalf of a customer user. A free form text box may be provided to allow the broker or broker clerk to enter a valid customer code that, in turn, provides the broker or broker clerk with a live trade window or entry on behalf of the specified customer. When a broker or broker clerk enters into the live trade on behalf of a user group, the group users may have their live trade entry section replaced by the live trade current status section. As such, the broker or broker clerk entered data may be displayed to the current status section of the respective customer's displays. If a broker or broker clerk attempts to enter into a live trade opportunity on behalf of a user group that is already entered into the live trade opportunity, the broker may receive a pop up message asking for verification to overwrite the existing entry. Such a message may be displayed in the pop up, "Are you sure you want to overwrite the existing entry for this User Group?" The pop up may give the user the option to accept and to cancel the message. If the message is accepted, the previous entry may be overwritten. If cancelled, the previous entry may remain, preferably unaffected.

It should be noted that, in one embodiment of the invention, a broker or broker clerk may enter into the live trade on behalf of multiple customer users. Additionally, any broker or broker clerk may modify an entry in the live trade, including those entries entered by other brokers or broker clerks. Specifically, when a broker or broker clerk selects a particular user group code from among other user group codes, the live trade current status may appear on the live trade window. The broker or broker clerk may then modify or remove user group from the live trade. It should be further noted that for brokers and broker clerks, the live trade current status may be displayed substantially simultaneously with the live trade entry section. The live trade current status may only display a message for the broker or broker clerk when an appropriate user group has been selected by the broker or broker clerk from among a number of user groups.

A live trade current status section of the display may include the messages given to users that are entering or have entered into the live trade, while time remains in the Work Up/Join the Trade opportunity. A message may appear after the group has entered into the live trade opportunity for the remaining timer countdown. The message may show the user group's intentions with respect to the live trade. The message may be dynamic and update as other users modify the size and/or direction of the live trade for the group.

Possible messages may be as follows: (wherein xx signifies the amount)
"Your institution is trying to buy xxMM . . ."
"Your institution is trying to sell xxMM . . ."
For Work Up live trade permission types, if the user group is trying to work up "more", the term may be included in the message:
"Your institution is trying to buy xxMM more . . ."
"Your institution is trying to sell xxMM more . . ."

A message may appear for Broker and Broker clerks when they have selected a user code from among a group of user codes such as a group included in a Participation Matrix (this will be explained in detail below). The message may be dynamic and update as other users modify the size and/or direction of the live trade for the group and may display for as long as the code is the input on the Broker or Broker clerk's live trade window. Such messages on the broker screens may be as follows: (xxxx being the user code)
"You are trying to buy xxMM on behalf of xxxx . . ."
"You are trying to sell xxMM on behalf of xxxx . . ."

A "Cancel Order" button (not shown) may display just below the status message for the remaining counter timer in a live trade window. When the cancel order is selected for a group, the live trade may be removed from the live trade window and the section may revert to the Live Trade Entry section, assuming time still remains in the live trade.

The "Cancel Order" button may also be displayed to the Broker or Broker clerk when they have selected a user code from the Participation Matrix. Selecting the "Cancel Order" button may remove the group from the live trade opportunity.

The Live Trade Current Status section may be replaced by the Live Trade Matched Status section immediately after the timer countdown expires.

The Live Trade Matched Status section of the display may be the final messages given to users after the timer has expired. Users may not be able to enter or cancel themselves from the live trade opportunity once the timer countdown has expired. When the timer countdown expires, and matching has completed, the section may display the result of the work up/join the trade for the relevant user group. If the result is an execution on the total submitted amount, the status may appear as—"Filled!" If the result is an execution on an amount that is less than the total submitted amount, the status may appear as—"Partially Filled!" If the result is no execution, the status may appear as—"A counterparty was not available to match against your order."

For brokers and broker clerks, when the timer countdown expires, and matching has completed, the section may display a message indicating the Participation Matrix has received and will store the results of the work up/join the trade matching.

One embodiment of a participation matrix 326 according to the invention may include a display that is provided preferably only for broker and broker clerk user. The matrix may not be available to the other user types.

The matrix may display those user codes that have entered into the live trade. The code may be displayed in either the "Buy" or "Sell" column, along with the amount they have contributed to the opportunity. The participation matrix may display the codes in order of matching priority. Priority has been explained in more detail above.

In one embodiment of matrix 326, work up user codes may appear in a different color to the join the trade codes in the matrix. Furthermore, the matrix may only display those codes associated with users that are currently active in the live trade. Those codes associated with users that have removed themselves from the live trade opportunity may be removed from the matrix. As stated above, the code may be selected by a broker, broker clerk or other suitably designated permission type from the participation matrix 326. When a code is selected, the details of the live trade entry may be displayed in the live trade window for that user group.

In the embodiment of the invention in which live trade instant messaging is provided, the user may be given the preference of displaying the work up/join the trade opportunity as an automatic pop up of the Live Trade Window or as an "instant message" with the Live Trade details displayed. The Live Trade Instant Message may alert the user of a work up/join the trade opportunity by displaying a small window that may "rise up"—i.e., elevate in a vertical direction—from the bottom of the user's screen, and may "sink down"—i.e., descend in a vertical direction—or dissipate in some suitable fashion off the screen after a specified period of time or by action from the user.

If several Live Trades are available to the user, the messages may stack vertically on the user's screen. The messages may display in chronological order, with the oldest message being displayed on the bottom of the other messages. The messages may always appear in the bottom right hand corner of the user's browser, regardless of the size of the browser, or in some other suitable place, either system-determined or user-defined, on the user's display and/or browser.

The Live trade Instant Message may display the following details:
Currency Pair e.g. [EUR/USD, USD/JPY]
Product e.g. [Straddle, Risk Reversal, Butterfly etc.]
Market Cutoff e.g. [NY, TK etc.)
Tenor e.g. [1 Month, 3 Month etc.]
Price e.g. [10.50, 0.25, 15.35 etc.]
Live Trade status e.g. (Work Up, Join the Trade]

Each work up/join the trade instant message may appear for 15 seconds, or for some other suitable time, on the user's screen. After 15 seconds, the message may "sink down" off the user's screen. The instant message may preferably not remove the user's focus from their current task. The Electronic trading system Live Trades Instant Message may only appear if the user has the alert set to "Instant Message" on their preferences.

An alert on a trading pod may be displayed when a work up/join the trade opportunity is available to the trader. The cell of the pod for which the work up/join the trade opportunity is available may appear in a light blue color, or in some other color that is different from the colors typically appearing on the user screen.

The cell may revert to its original color after the Live Trade timer expires or at some other suitable pre-determined time. The Live Trade Pod Indicator may always be displayed when a work up/join the trade opportunity exists, regardless of the user's preferences. When the user double clicks on the cell, the Live Trades Window, as shown in FIG. 3, may display.

Prices may be submitted into the market while a live trade is in progress. In one embodiment of the invention, new prices entered into the market may not participate in the live trade already in progress. New prices entered into the market while the live trade is in progress may not allow entries better than, or equal to, the active trading level. In such circumstances that you enter the same or better prices than are available in the market, the user may receive the message: "A Live Trade is currently in progress at this price level. Open the Live Trade interface to participate." For options, a "better" price means a bid that is higher or an offer price that is lower than the traded price.

Prices may be removed from the market while a live trade is in progress. Price removal using the hold buttons, the functionality of said hold buttons being described in more detail above, may remove the users active prices from any live trade opportunity they have entered.

If the Broker or Broker clerk hits the "Hold All" panic button (not shown) on the user interface, all prices in all open pods (the term "pod" or "pods" as used herein indicates some subset of the greater market") may be held and any live trade opportunities that are currently in progress may be cancelled. Following such a selection, users may receive the Live Trade Matched Status message indicating no execution took place.

Alternatively, if the Broker or Broker clerk hits the "F4" button and specifies a Reuter customer code on the screen, all prices for the Reuter customer code group associated with that user code may be held and removed, and any live trade opportunities, for that code may be cancelled.

Traders that do not have their full size fully executed through the live trade may have the unmatched details sent to the "Messages" window on the screen. The following information may be displayed in the window in blue (or other suitable color) font:
  User name
  User code
  Entered direction
  Currency pair
  Cutoff
  Product
  Tenor
  Entered size
  Unmatched size
Preferably, only brokers and broker clerks may be able to view these messages. All other user types may be restricted from seeing these messages.

Each live trade display may present the remaining time for the live trade opportunity in black bolded font or in some other suitable font. When the timer reaches 5 seconds it may display in red bolded font or other suitable font. If multiple live trade opportunities are displayed in the Live Trade Window simultaneously, the timers may preferably independent of one other.

As described above, the countdown timer may show a specified interval that represents the time in which traders must act if they wish to participate in the "work up/join the trade" feature. The interval is the entire amount of time the trader may be given to review, modify, and respond to the live trade. The countdown may be system wide—i.e., that each user is given the same start and end time and may be required to react to the live trade within that time range if they wish to participate.

The Individual Live Trade Display may show the timer background in orange or other suitable color when a Live Trade is joined or worked up by a counterparty. In some embodiments of the invention, no additional details of the work up or join the trade request may be displayed, such as counterparty name or sizes entered. The orange work up/join the trade indicator may display to both traders and brokers. In certain embodiments of the invention, the orange highlight may only display if someone other than the logged in trader or broker has submitted to the work up or join the trade. The timer may not be highlighted if the signed in user is the only one to have worked up or joined.

In some embodiments of the invention, work up or join cancellations by a user may not remove the orange highlight. In addition, sizes that are automatically worked up or joined may trigger the orange highlight. Finally, with respect to work up or join requests from a user's group may trigger the orange highlight for each of the individual users of the group.

In another aspect of the invention, a user preference console according to the invention may have a "Live Trade Alert" preference added. The preference may be designated for use on a per user, per currency pair and per product basis. A user may be able to set their preference for Live Trade alerts per pod. The user may be given a choice of three options in a user preference console according to the invention:

Pop up: The pop up option may automatically display the Live Trades Window in the forefront of the user's browser. The pop up may preferably display only when a trade has occurred in the pods for which the pop up option is set. For example, if the user has EUR/USD Straddle set to pop up and EUR/USD Risk Reversal set to another option, only when an execution in EUR/USD Straddle may the Live Trade Window appear automatically on the browser. An execution in EUR/USD Risk Reversal may initiate the other option and not open the automatic pop up.

Instant Message: The instant message option may only display the Live Trade Instant Message window. The pop up may not automatically appear. The instant message may display only when a trade has occurred in the pods for which the instant message option is set.

None: Only the Live Trades pod indicator may appear to the user when this option is set and an execution takes place in the pod.

The alert setting may be available via the new "Preferences" menu on the user interface.

A "Global" entry may also be available to allow users to set a default alert. The "Global" entry may apply to all currency pair and product combinations that did not set a specific Live Trade alert. A currency pair and product with a specified default alert will override the global default.

Figure 4:
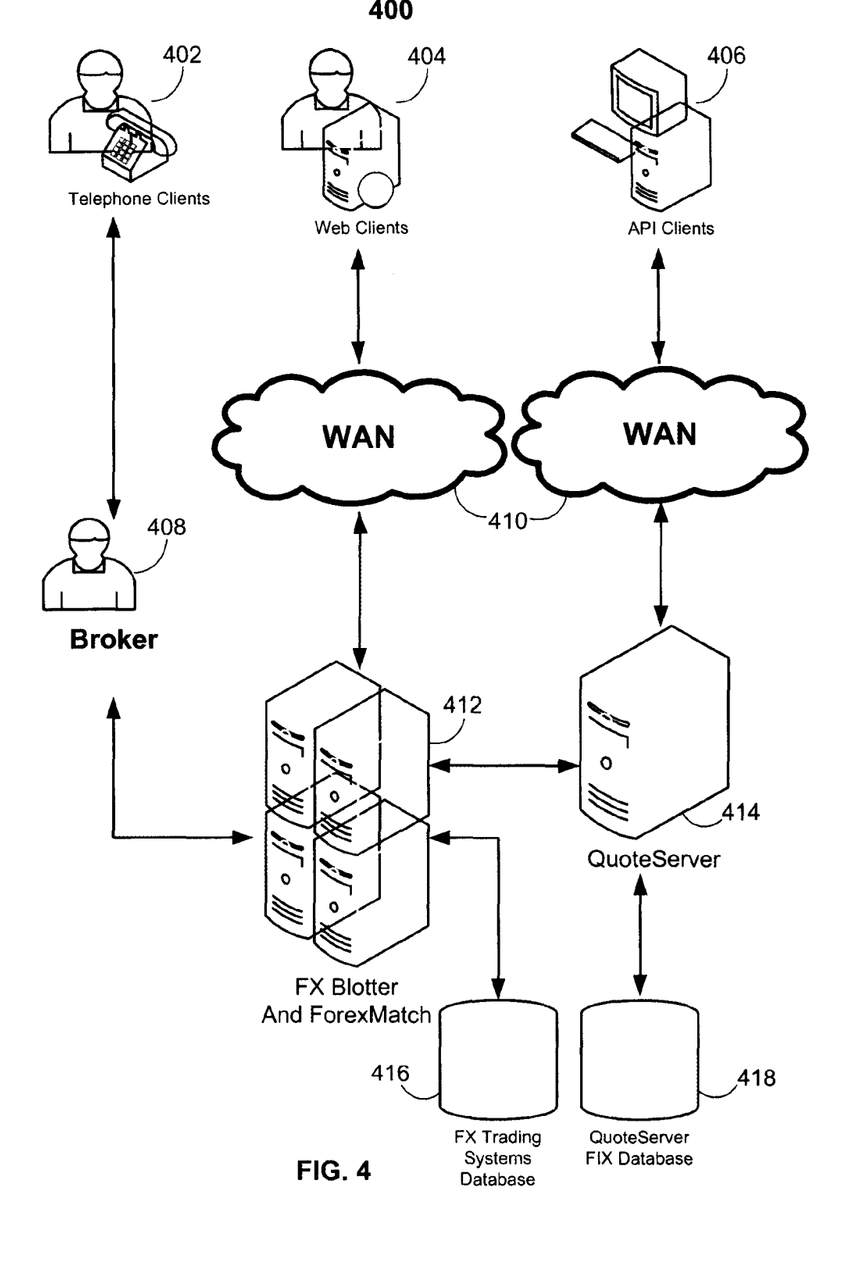
FIG. 4 is a schematic diagram of an exemplary electronic trading system according to the invention.

FIG. 4 shows an embodiment of a global foreign exchange trading system 400 that may preferably be used to support in accordance with the systems and methods described herein. System 400 may preferably be used by telephone clients 402, web clients 404, and API (application programming interface) clients 406. In system 400, telephone clients may preferably perform their trading through brokers 408 while web clients and API clients may trade via a wide area network 410. All trade information, independent of the type of user trading, may be captured by a suitable trade recording system such as ForexMatch and FX Blotter 412, produced by GFI Group, Inc. of New York, N.Y. ForexMatch is GFI's trading screen for its FX Option brokerage operations. It supports GFI's hybrid brokerage model, combining traditional voice brokerage services with sophisticated electronic trading technology to deliver efficient deal execution. The FX Blotter is a web-based tool for the capture of FX Option deals done through GFI's voice-based brokerage business and through the interactive trading platform ForexMatch. Both the buyer and the seller can see and download the trade details, thus reducing the risk of incorrect data input. FX option trading can cause operational problems through incorrect entry, unconfirmed trades and confirmation mismatches. FX blotter can help clients address this by being a key component of their straight-through processing (STP). FX Blotter can deliver fewer input errors, faster trade entry and improved efficiency. The FX Blotter will contain the logic for sending STP details to client systems. STP messages can either be confirmed manually or automatically by the client's system, depending on their preference.

QuoteServer TM 414, also produced by produced by GFI Group, Inc., may communicate prices, trade executions and trade confirmations between the client systems and FX Blotter 412 without the use of a web server. FX Blotter 412 may be supported by FX trading system database 416 while QuoteServer 414 may be supported by QuoteServer FIX database 418.

QuoteServer TM 414 allows clients to connect to the GFI FX Trading System by establishing a TCP/IP connection via an API. An API (application programming interface) is the interface that GFI provides in order to allow requests for services to be made by other client computer programs. QuoteServer TM 414 will store all request and response messages to the QuoteServer FIX Engine to the QuoteServer TM FIX Database.

Figure 5:
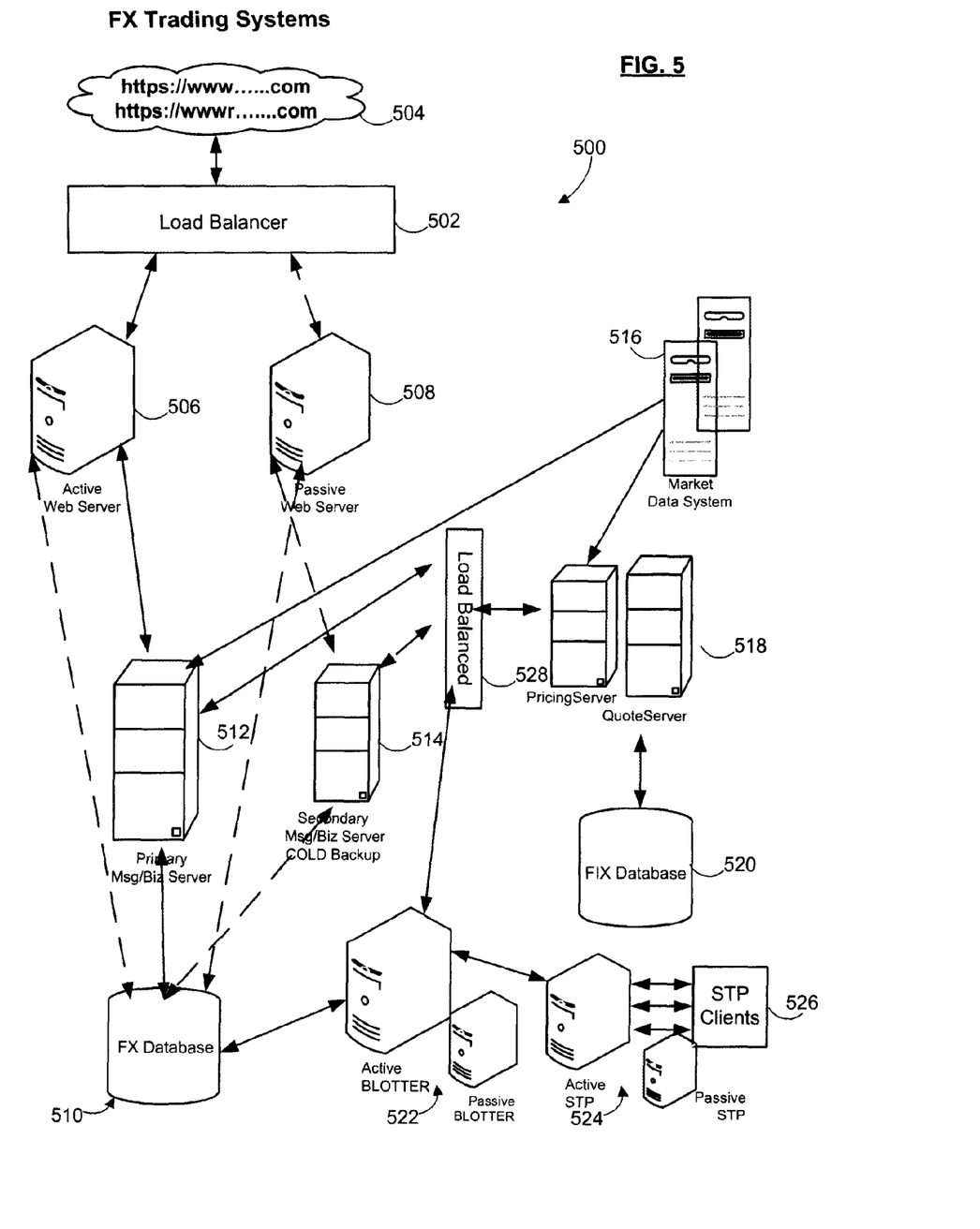
FIG. 5 is another schematic diagram of an exemplary electronic trading system according to the invention.

FIG. 5 shows another embodiment of a trading system 500 that may be used to support systems and methods according to the invention. System 500 preferably shows a Load Balancer 502 for interfacing between traffic from the web 504 and an active web server 506 (which is supported by passive web server 508). Active web server preferably communicates with an FX database 510 and a primary message server 512 (which is backed up by a secondary message server cold backup 514).

Primary message server 512 is preferably also coupled to market data system 516. A pricing server/quote server 518 is preferably in communication with a FIX database 520 and mark data system 516.

FX database 510 may preferably also communicate with an Active blotter/passive blotter 522 which, in turn, may communicate with Active STP/Passive STP 524 to STP (straight-through processing) clients 526. Finally primary message server 512, pricing server/quote server 518 and active blotter/passive blotter 522 may all be load balanced by a load balancer at 528.

Thus it is seen that systems and methods for enabling trading of currencies and currency options has been provided. One skilled in the art may appreciate that the present invention can be practiced by other than the described embodiments, which are presented for purposes of illustration rather than of limitation, and the present invention is limited only by the claims which follow.

Systems and method of enabling trading in currencies are provided. A method of trading a foreign currency option on an electronic trading system according to the invention may include executing a trade of the foreign currency option between a buyer and a seller, locking the trading system with respect to the traded foreign currency option, querying the buyer whether the buyer desires to buy or sell additional volume of the option, querying the seller whether the seller desires to sell or buy additional volume of the option, and authorizing additional participants to join the trade and querying the additional participants whether each of the additional participants desires to buy or sell a volume of the option. The method may also include starting a countdown timer and displaying the timer on the graphical user interface of the buyer, the seller and the additional parties and receiving buy and sell orders from the at least one of the buyer, the seller and additional participants. Following the expiration of the countdown timer, the method preferably includes matching existing buy orders and sell orders for the option. In one embodiment of the invention, the matching occurs according to a predetermined order priority.

What is claimed is:

1. An electronic trading system adapted to provide a communication platform for a plurality of workstations, each of said workstations permissioned to operate at an authorization level in said trading system, said authorization levels comprising:

a broker workstation authorization level, the broker workstation authorization level authorized to view prices of current orders, enter bids or offers on behalf of the broker or on behalf of customer participants, and trade on current bids or offers on behalf of the broker or on behalf of customer participants;

an interactive trader workstation authorization level, the interactive trader workstation authorization level authorized to view prices of current orders, enter bids or offers, and trade on current bids or offers;

a view only workstation authorization level, the view only workstation authorization level authorized to view prices of current orders;

a memory; and at least one processor, the at least one processor for executing instructions for displaying a graphical user interface, said interface for use in trading a financial instrument, the graphical user interface comprising:

a countdown timer, financial instrument information and trade action buttons, the countdown timer showing time left for a join the trade opportunity, said join the trade opportunity generated in response to said at least one processor:

executing a trade of a financial instrument between a buyer and a seller;

locking the electronic trading system with respect to the traded financial instrument to prevent additional participants from joining the trade while the buyer and seller are queried to trade additional volume of the financial instrument;

querying the buyer whether the buyer desires to buy or sell additional volume of the instrument; and querying the seller whether the seller desires to sell or buy additional volume of the instrument;

wherein the processor is configured to start the join the trade opportunity by authorizing additional participants to join the trade; and to start the countdown timer;

wherein the join the trade opportunity comprises querying at least a portion of the additional participants to determine whether each of the additional participants desires to buy or sell a volume of the financial instrument, and wherein the processor is configured to determine whether bids or offers provided by the additional participants were in the system at the time of execution of the trade of the financial instrument between the buyer and the seller and, if the bids or offers provided by the additional participants were in the system at the time of execution of the trade of the financial instrument between the buyer and the seller, then maintaining the bids or offers provided by the additional participants following the conclusion of the join the trade opportunity.

2. The system of claim 1 wherein each of the workstations are authorized to log in.

3. The system of claim 1 wherein each of the workstations is authorized to receive execution alerts about trade executions.

4. The system of claim 1 further comprising a no interest button.

5. The system of claim 1 further comprising a plurality of increment buttons and a plurality of decrement buttons.

6. The system of claim 1 further comprising a broker section, said broker section showing trade positions of a plurality of trading participants.

7. The system of claim 1 further comprising a price section.

8. The system of claim 1 further comprising a volume section.

9. The system of claim 1 further specifying whether a workstation was one of the participants of an original trade execution or is a join the trade participant.

10. One or more non-transitory computer-readable media storing computer-executable instructions which, when executed by a processor on a computer system, perform a method for trading a financial instrument, the trading a financial instrument using an electronic trading system adapted to provide a communication platform for a plurality of workstations, each of said workstations permissioned to operate at an authorization level in said trading system, said authorization levels comprising a broker workstation authorization level, the broker workstation authorization level authorized to view prices of current orders, enter bids or offers on behalf of the broker or on behalf of customer participants, and trade on current bids or offers on behalf of the broker or on behalf of customer participants; an interactive trader workstation authorization level, the interactive trader workstation authorization level authorized to view prices of current orders, enter bids or offers, and trade on current bids or offers; a view only workstation authorization level, the view only workstation authorization level authorized to view prices of current orders, the non-transitory computer-readable media using at least one processor for executing instructions for displaying a graphical user interface, said interface for use in trading a financial instrument, the instructions comprising:

a first set of instructions for displaying a countdown timer, financial instrument information and trade action buttons, the countdown timer showing time left for a join the trade opportunity, said join the trade opportunity generated in response to said at least one processor executing a first trade of a financial instrument between a buyer and a seller; locking the electronic trading system with respect to the traded financial instrument to prevent additional participants from joining the trade while the buyer and seller are queried to trade additional volume of the financial instrument; querying the buyer whether the buyer desires to buy or sell additional volume of the instrument; and querying the seller whether the seller desires to sell or buy additional volume of the instrument;

wherein the processor is configured to start the join the trade opportunity by authorizing additional participants to join the trade; and to start the countdown timer; wherein the join the trade opportunity comprises querying at least a portion of the additional participants to determine whether each of the additional participants desires to buy or sell a volume of the financial instrument; and a second set of instructions for determine whether bids or offers provided by the additional participants were in the system at the time of execution of the trade of the financial instrument between the buyer and the seller and, if the bids or offers provided by the additional participants were in the system at the time of execution of the first trade of the financial instrument between the buyer and the seller, then maintaining the bids or offers provided by the additional participants following the conclusion of the join the trade opportunity.

11. The system of claim 1 wherein each of the workstations are authorized to log in.

12. The system of claim 1 wherein each of the workstations is authorized to receive execution alerts about trade executions.

13. The system of claim 1 further comprising a no interest button.

14. The system of claim 1 further comprising a plurality of increment buttons and a plurality of decrement buttons.

15. The system of claim 1 further comprising a broker section, said broker section showing trade positions of a plurality of trading positions.

16. The system of claim 1 further comprising a price section.

17. The system of claim 1 further comprising a volume section.

18. The system of claim 1 further specifying whether a workstation was one of the participants of an original trade execution or is a join the trade participant.

19. One or more non-transitory computer-readable media storing computer-executable instructions which, when executed by a processor on a computer system, perform a method for trading a financial instrument, the trading a financial instrument using an electronic trading system adapted to provide a communication platform fbr a plurality of workstations, each of said workstations permissioned to operate at an authorization level in said trading system, said authorization levels comprising a broker workstation authorization level, the broker workstation authorization level authorized to view prices of current orders, enter bids or offers on behalf of the broker or on behalf of customer participants, and trade on current bids or offers on behalf of the broker or on behalf of customer participants; an interactive trader workstation authorization level, the interactive trader workstation authorization level authorized to view prices of current orders, enter bids or offers, and trade on current bids or offers; a view only workstation authorization level, the view only workstation authorization level authorized to view prices of current orders, the non-transitory computer-readable media using at least one processor for executing instructions for displaying a graphical user interface, said interface for use in trading a financial instrument, the instructions comprising:

a first set of instructions for displaying a countdown timer, financial instrument information and trade action buttons, the countdown timer showing time left for a join the trade opportunity, said join the trade opportunity generated in response to said at least one processor executing a first trade of a financial instrument between a buyer and a seller; locking the electronic trading system with respect to the traded financial instrument to prevent additional participants from joining the trade while the buyer and seller are queried to trade additional volume of the financial instrument; querying the buyer whether the buyer desires to buy or sell additional volume of the instrument; and querying the seller whether the seller desires to sell or buy additional volume of the instrument;

wherein the processor is configured to start the join the trade opportunity by authorizing additional participants to join the trade; and to start the countdown timer; wherein the join the trade opportunity comprises querying at least a portion of the additional participants to determine whether each of the additional participants desires to buy or sell a volume of the financial instrument; and a second set of instructions for determine whether bids or offers provided by the additional participants were in the system at the time of execution of the trade of the financial instrument between the buyer and the seller and, if the bids or offers provided by the additional participants were in the system at the time of execution of the first trade of the financial instrument between the buyer and the seller, then maintaining the bids or offers provided by the additional participants after a time at which the countdown timer displays no remaining time in the join the trade opportunity.

\* \* \* \* \*